US007008539B2

(12) United States Patent
Johnson et al.

(10) Patent No.: US 7,008,539 B2
(45) Date of Patent: Mar. 7, 2006

(54) SUBMERGED AMMONIA REMOVAL SYSTEM AND METHOD

(75) Inventors: Kraig Johnson, Lehi, UT (US); Lawrence D. Reaveley, Salt Lake City, UT (US); Youngik Choi, Salt Lake City, UT (US)

(73) Assignee: University of Utah Research Foundation, Salt Lake City, UT (US)

( * ) Notice: Subject to any disclaimer, the term of this patent is extended or adjusted under 35 U.S.C. 154(b) by 0 days.

(21) Appl. No.: 10/846,828

(22) Filed: May 13, 2004

(65) Prior Publication Data

US 2004/0245173 A1 Dec. 9, 2004

Related U.S. Application Data

(60) Provisional application No. 60/470,280, filed on May 14, 2003.

(51) Int. Cl.
*C02F 3/06* (2006.01)

(52) U.S. Cl. ....................... 210/615; 210/150; 210/903

(58) Field of Classification Search ................ 210/615, 210/620, 150, 151, 170, 923, 903
See application file for complete search history.

(56) References Cited

U.S. PATENT DOCUMENTS

| | | | | |
|---|---|---|---|---|
| 3,739,912 A | | 6/1973 | Miller, Jr. | |
| 3,768,788 A | | 10/1973 | Candel | |
| 3,788,478 A | | 1/1974 | Savage | |
| 3,904,525 A | | 9/1975 | Rosenberg | |
| 4,051,035 A | | 9/1977 | Boschen et al. | |
| 4,190,543 A | * | 2/1980 | Pederson et al. | 210/151 |
| 4,279,753 A | | 7/1981 | Nielson et al. | |
| 4,288,394 A | | 9/1981 | Ewing et al. | |
| 4,370,234 A | * | 1/1983 | Marsland | 210/903 |
| 4,415,454 A | | 11/1983 | Fuchs | |
| 4,479,876 A | | 10/1984 | Fuchs | |
| 4,632,758 A | | 12/1986 | Whittle | |
| 4,818,404 A | | 4/1989 | McDowell | |
| 4,842,732 A | | 6/1989 | Tharp | |
| 5,122,266 A | * | 6/1992 | Kent | 210/150 |
| 5,160,620 A | * | 11/1992 | Lygren | 210/151 |
| 5,185,080 A | | 2/1993 | Boyle | |
| 5,211,847 A | | 5/1993 | Kanow | |
| 5,228,998 A | | 7/1993 | DiClemente et al. | |
| 5,316,671 A | | 5/1994 | Murphy | |
| 5,326,459 A | * | 7/1994 | Hlavach et al. | 210/150 |
| 5,389,247 A | * | 2/1995 | Woodside | 210/151 |
| 5,507,950 A | * | 4/1996 | Senda et al. | 210/615 |
| 5,514,278 A | | 5/1996 | Khudenko | |
| 5,518,620 A | | 5/1996 | Eguchi et al. | |
| 5,531,894 A | | 7/1996 | Ball et al. | |
| 5,545,327 A | * | 8/1996 | Volland | 210/615 |
| 5,556,536 A | | 9/1996 | Turk | |
| 5,626,755 A | | 5/1997 | Keyser et al. | |
| 5,651,892 A | | 7/1997 | Pollock | |
| 5,681,471 A | | 10/1997 | Silverstein | |
| 5,702,604 A | | 12/1997 | Yamasaki et al. | |

(Continued)

*Primary Examiner*—Christopher Upton
(74) *Attorney, Agent, or Firm*—Thorpe North & Western LLP

(57) ABSTRACT

A system and method for reducing the content of ammonia in water provides a submerged surface having a growth of nitrifying bacteria thereon. An aeration system creates air bubbles that travel along the surface as they rise to create aerobic conditions on the surface, and to circulate the water along the surface to allow the nitrifying bacteria to remove ammonia from the water.

18 Claims, 9 Drawing Sheets

U.S. PATENT DOCUMENTS 5,846,425 A 12/1998 Whiteman
5,861,095 A * 1/1999 Vogel et al. ................ 210/150
5,863,435 A 1/1999 Heijnen et al.
5,954,451 A 9/1999 Presby
5,972,212 A * 10/1999 Hongo ....................... 210/150
6,007,720 A 12/1999 Tomita

* cited by examiner

SUBMERGED AMMONIA REMOVAL SYSTEM AND METHOD

CROSS REFERENCE TO RELATED APPLICATIONS

This application claims priority to U.S. provisional patent application No. 60/470,280 filed May 14, 2003 and entitled AERATED SUBMERGED BIO-FILM FOR WASTEWATER TREATMENT LAGOON ENHANCEMENT.

FEDERAL RESEARCH STATEMENT

This invention was made with support from the United States Government, and the United States Government may have certain rights in this invention pursuant to USDA SBIR Grant (Proposal 2002-00234).

BACKGROUND OF THE INVENTION

1. Field of the Invention

The present invention relates generally to water treatment. More particularly, the present invention relates to a system and method for removing ammonia from water, such as wastewater.

2. Related Art

Wastewater treatment lagoons are one of the most widespread treatment technologies in the United States, and quite possibly one of the most neglected. Lagoons as a treatment technology are suited for small to medium sized rural communities, animal feedlot operations, as well as some industries. The primary advantages of lagoons are low cost and ease of operation. Generally speaking, lagoons are effective at removing organic material and suspended solids, provided the lagoons are not overloaded. One disadvantage of most types of lagoon systems is their inability to remove ammonia compounds from the water.

Ammonia is the primary cause of stench and subsequent neighbor complaints from lagoon systems. Ammonia is not removed from the wastewater stream in lagoons because the growth of nitrifying bacteria is not encouraged. These bacteria are inhibited by sunlight, and are out-competed by algae and most other free-floating bacteria.

The lack of nitrification of ammonia compounds is due to several factors inherent in the design of an open lagoon. The conversion of ammonia to nitrite and then nitrate depends on a class of bacteria known collectively as nitrifiers. Nitrifying bacteria are somewhat fickle compared to other bacteria such as zooglea and organisms like algae that thrive in wastewater treatment lagoons. Nitrifying bacteria are slower growing than zooglea and algae. They are also inhibited by direct sunlight. They have a total oxygen demand to convert ammonia to nitrate that is quite high. These bacteria are also temperature sensitive, and are generally inhibited at temperatures below 11° C. It is also known that the waste secretions from certain strains of algae can be inhibitory to nitrifying bacteria.

Aerobic and anaerobic decomposition of nitrogenous organic compounds in the lagoon release ammonia into the water column, thus adding to the dissolved ammonia levels. The TKN (Total Kjeldahl Nitrogen) level of the influent wastewater can be thought of as an indicator of the ultimate possible ammonia loading as the nitrogen in the organic compounds is biologically converted to ammonia. One additional source of ammonia in the water should be mentioned. A few genera of photosynthetic algae can also fix atmospheric $N_2$ gas (i.e. convert $N_2$ into $NH_3$). The extent of ammonia addition to wastewater treatment lagoons has not been quantified at this time.

At neutral pH levels, the ammonia molecule is in the form of ammonium ($NH_4$+), a highly soluble compound with a low water-to-air transfer coefficient. In other words, ammonium wants to stay in solution with the water. Gas stripping of ammonia is usually accomplished by adjusting the pH of the water to around 10.5. An example of this is given in Tchobanoglous, G. and E. D. Schroeder, *Water Quality,* 535–538 (Addison-Wesley, 1987).

Trickling filters are one of the oldest forms of wastewater treatment. Rocks, or other media designed to have a high surface area to volume ratio are stacked in a basin and wastewater is trickled over the media. Attached growth organisms metabolize the organic material out of the wastewater as it flows past the surface. The thickness of the film provides conditions suitable for aerobic bacteria at the free surface, and anaerobic bacteria near the media surface. Nitrifying and denitrifying bacteria are considered facultative bacteria and thrive in the interface between the aerobic and anaerobic zones. Trickling filters are effective at removing ammonia from wastewater due to this extensive zone favorable to the growth of ammonia consuming organisms. Growth of these organisms is favored because the sunlight is blocked in the depths of the filter, the metabolism of the bio-film increases the temperature within the bio-film, the fixed media provides extremely long detention times for the bacteria (the film remains in place until it becomes so thick that it sluffs off), and the exact oxygen requirements for the nitrifying bacteria and the denitrifying bacteria will be met at some point across the thickness of the bio-film.

Other designs that provide surface area for fixed film growth are Rotating Biological Contractors (RBCs), and various designs that place foam blocks and spacers or fibrous material down in the wastewater.

The primary disadvantages of a trickling filter are the initial capital costs to build the filter, pumping costs to lift the wastewater plus recycle to the top of the filter, maintenance of the mechanical distribution system at the top of the filter, and ultimate disposal replacement of the media within the filter. (Plastic media within the filter has an estimated life of 10 to 15 years, and must be disposed of as a hazardous waste when removed.)

RBCs require mechanical rotation systems, and provide much less surface area than plastic media filters. Capital costs to reach the equivalent surface area of a trickling filter can be quite high, although the energy costs to rotate the devices are generally a fraction of the pumping costs for trickling filters.

The metabolism of nitrifying bacteria is enhanced when the bacteria are immobilized on a fixed film surface, as opposed to free-floating bacterial colonies. Scandinavian researchers subjected the species *Nitrobacter agilis* to temperature variations from 30° C. to 12° C. Suspended growth bacteria experienced a 90% reduction in nitrification activity, whereas the fixed film bacteria only experienced a 20% reduction in nitrification activity. Other advantages of attached growth bacteria are enumerated in an article by Criddle et al. found in Bear, J. and M. Y. Corapcioglu, eds., *Transport Processes in Porous Media,* 641–691 (Kluwer Academic Pubs, 1991).

Most lagoon systems are devoid of oxygenated surfaces that are blocked from the sunlight. The bottom of the lagoon does not provide surface area because it is unconsolidated media and is anoxic. As such, lagoon systems do not nitrify ammonia compounds. High ammonia levels are fairly typical in lagoon effluents.

SUMMARY OF THE INVENTION

It has been recognized that it would be advantageous to develop a simple and reliable system and method for removing ammonia from water, such as wastewater.

The invention advantageously provides a system for reducing the content of ammonia in water. The system includes a surface, substantially submerged in the water, having a bio-film of nitrifying bacteria thereon. A bubble system is provided, configured to create air bubbles that travel along the submerged surface as they rise, so as to (i) create aerobic conditions at the bio-film and (ii) circulate the water along the surface.

In accordance with a more detailed aspect thereof, the present invention provides a system for reducing the content of ammonia in wastewater. The system provides a surface that is substantially submerged in the wastewater, is aligned in a substantially non-vertical orientation, is substantially shielded from sunlight, and has a bio-film of nitrifying bacteria thereon. The system also includes an aeration system, configured to release air bubbles at a lower extremity of the submerged surface, such that the air bubbles travel along the submerged surface as they rise to create aerobic conditions at the bio-film, and such that the wastewater is circulated along the submerged surface.

In accordance with another aspect of the present invention, the invention provides a method for reducing the content of ammonia in water, comprising the steps of providing a submerged surface having a bio-film of nitrifying bacteria thereon, creating air bubbles that travel along the surface as they rise to create aerobic conditions on the surface, and contacting the water along the surface to allow the nitrifying bacteria to remove ammonia from the water.

Additional features and advantages of the invention will be apparent from the detailed description which follows, taken in conjunction with the accompanying drawings, which together illustrate, by way of example, features of the invention.

DETAILED DESCRIPTION

Figure 1:
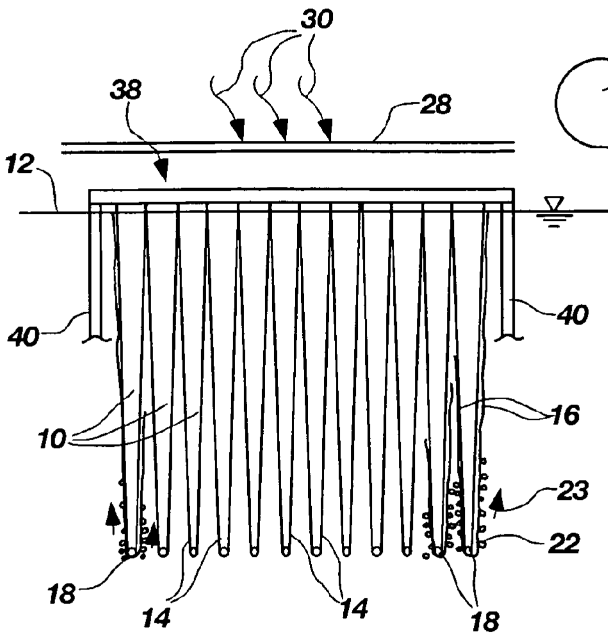
FIG. 1 is a side view of one embodiment of a group of aerated submerged bio-film panels disposed in wastewater.

Reference will now be made to the exemplary embodiments illustrated in the drawings, and specific language will be used herein to describe the same. It will nevertheless be understood that no limitation of the scope of the invention is thereby intended. Alterations and further modifications of the inventive features illustrated herein, and additional applications of the principles of the inventions as illustrated herein, which would occur to one skilled in the relevant art and having possession of this disclosure, are to be considered within the scope of the invention.

The present invention provides a simple and effective system and method for removing ammonia from water. The system can be used to enhance the performance of wastewater treatment lagoons, or other applications. The system operates through the addition of specially designed submerged structures that encourage the growth of a bio-film of certain types of nitrifying bacteria. The inventors have recognized that ammonia-consuming bacteria need four basic conditions to really flourish: a submerged surface to adhere to, an adequate supply of oxygen, protection from sunlight, and a supply of ammonia. The inventors have devised the present invention in order to provide these conditions in a simple system.

The invention generally provides a system for the enhancement of the performance of certain types of ammonia-consuming bacteria when the bacteria are incorporated into a bio-film. Air is supplied directly to the submerged bio-film surfaces to enhance oxygen transfer to the bacteria in the bio-film. While the invention is depicted and described as used in wastewater treatment, it will be apparent that the invention can be used for the treatment of any water to remove ammonia therefrom, whether the water is considered wastewater or not. For example, other applications include agricultural irrigation return water, anaerobic digester supernatant, industrial process water, etc.

Figure 2:
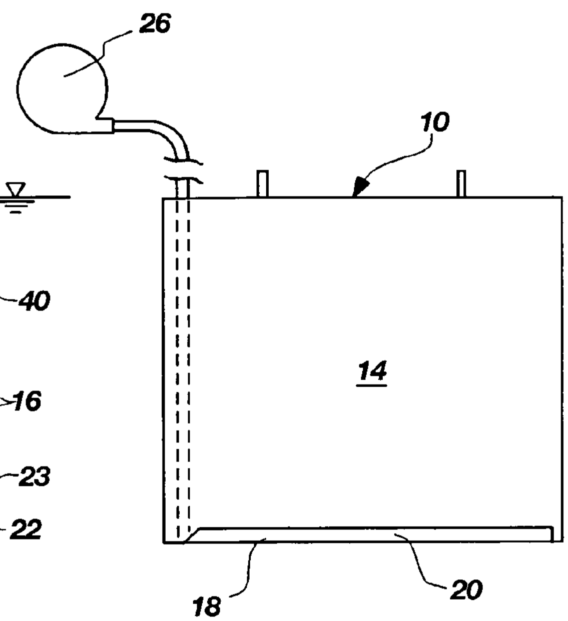
FIG. 2 is a front view of an aerated submerged bio-film panel of FIG. 1.

The basic structure of the ammonia removal system is shown in FIGS. 1 and 2. The system basically comprises one or more panels 10 that are submerged in water 12, such as wastewater. The panels can be made of a variety of materials, so long as they are durable in the water or wastewater environment. Structures that provide the surface area must be able to withstand corrosion while submerged in a wastewater stream for years. High surface area to volume ratio is desired, yet plugging of the media must be avoided. It is also desirable that the panels be of materials that are nontoxic. Suitable materials include concrete, plastics, metal, etc. It is even believed that garbage elements or recycled waste products can be fabricated into suitable panels for application in the present invention. In tests carried out by the inventors, panels of reinforced concrete were used.

Growing on the side surfaces 14 of the panels 10 is a film 16 of nitrifying bacteria. The conversion of ammonia to nitrite and then nitrate depends on a class of bacteria known collectively as nitrifiers. The metabolism of nitrifying bacteria is enhanced when the bacteria are immobilized on a fixed substrate, as opposed to being free-floating bacterial colonies. There are a variety of species of nitrifying bacteria that can be suitable for the present invention, such as *Nitrobacter agilis*. All species colonizing this bio-film are naturally-occurring bacteria in the environment. No special species are required for this invention to work. Instead, the invention is simply configured to enhance a naturally occurring process. Nitrifying and denitrifying bacteria are considered facultative bacteria, and thrive in the interface between the aerobic and anaerobic zones. In one test of the present invention, the submerged panels were first inoculated with buckets of trickling filter effluent water (known to be rich in nitrifying bacteria). After the bacteria had sufficient time to become established on the panels and it was confirmed that ammonia removal was occurring, it was observed that the bio-film took on a slightly reddish-brown hue.

Disposed at the lower end of each panel 10 is a compressed air conduit 18 with openings 20 that are configured to release air bubbles 22. The compressed air conduit in the panel is connected to a series of other air conduits (24 in FIGS. 3, 4) that are eventually connected to a compressed air source 26, such as a compressor. Compressed air is released along the bottom edge of the panels, and, as the bubbles rise up, they contact the bio-film 16 along the side surfaces 14 of the panels. The bio-film is thus supplied with a continual stream of oxygenated air. For efficiency, it is desirable to provide just enough air for the oxygen demand of the nitrifying bio-chemical processes of the bacteria, without wasting energy by providing more air than is needed. Those skilled in the art will be able to determine suitable aeration levels for this purpose.

While the panels 10 depicted in FIG. 1 (and the other figures herein) are shown with non-vertical surfaces, the bio-film panels of the present invention could be vertical or configured with vertical sides. However, panels with sloping or non-vertical surfaces are preferred, so as to continually force the air bubbles 22 against the surface of the bio-film 16 as they rise, rather than allowing the bubbles to be deflected outwardly away from those surfaces. A relatively small non-vertical angle is sufficient to provide this function. For example, the panels 10 shown in FIG. 1 have an angle of about 3° from the vertical. It is believed that even smaller angles could still provide the desired bubble contact time benefit. At the same time, greater angles (i.e. surfaces that are closer to horizontal) will tend to slow the rate of rising of the air bubbles, thus increasing contact time of the bubbles with the bio-film. This can be desirable for shallower wastewater lagoons, or for other reasons.

Advantageously, the rising bubbles 22 also create flow patterns in the water, represented by arrows 23, pulling the water up from the bottom along the bio-film surfaces 16, and thereby enhancing circulation to promote complete treatment of the water. Accordingly, the bio-film is thus supplied with a continual stream of nutrient rich water, in addition to the oxygenated air.

It is also desirable to protect the bio-film 16 from sunlight. As noted above, nitrifying bacteria are inhibited by direct sunlight. Additionally, sunlight can also encourage the growth of algae on the bio-film surface. Accordingly, in the embodiment of FIG. 1, the assembly of submerged panels 10 is covered by a light barrier 28. The light barrier can be a roof, a cover (such as a cover that floats on the surface of the water), or any comparable structure which shields the submerged bio-film from sunlight (represented by arrows 30). The light-shielded environment encourages the growth of nitrifying bacteria. Other embodiments of the submerged panels also help shield the bio-film from sunlight, as discussed below.

The size of the panels 10 can vary within a wide range. In an embodiment consistent with FIGS. 1 and 2, the inventors have constructed bio-film panels that were about 2 feet tall. However, the system of the present invention can be used in bodies of water of any depth, limited only by the survivability of the nitrifying bacteria. For example, it is believed that the system of the present invention can be adapted to treat salt water or sea water, with the appropriate bacteria. Accordingly, the panels can be made to whatever size needed to extend to the desired depth.

Figure 3:
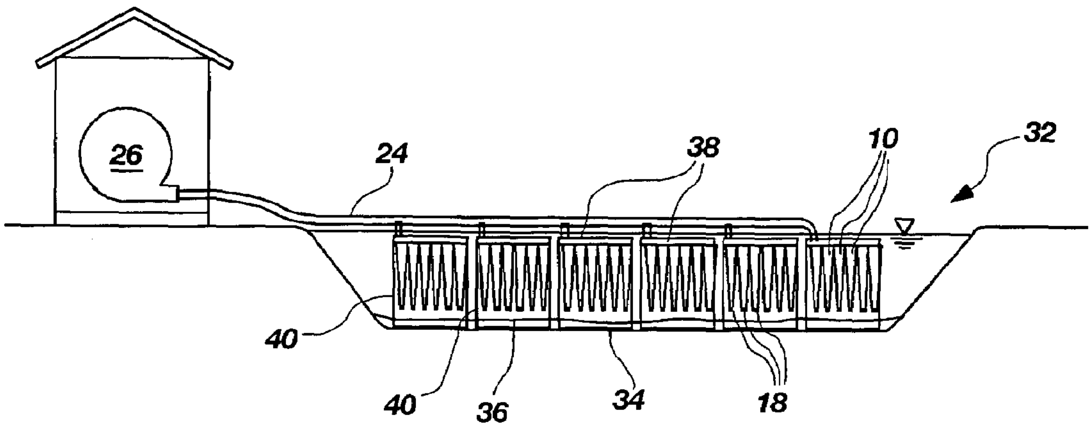
FIG. 3 is a cross-sectional view of a wastewater treatment lagoon having a plurality of aerated submerged bio-film panels mounted on frames resting on the bottom of the lagoon.
Figure 4:
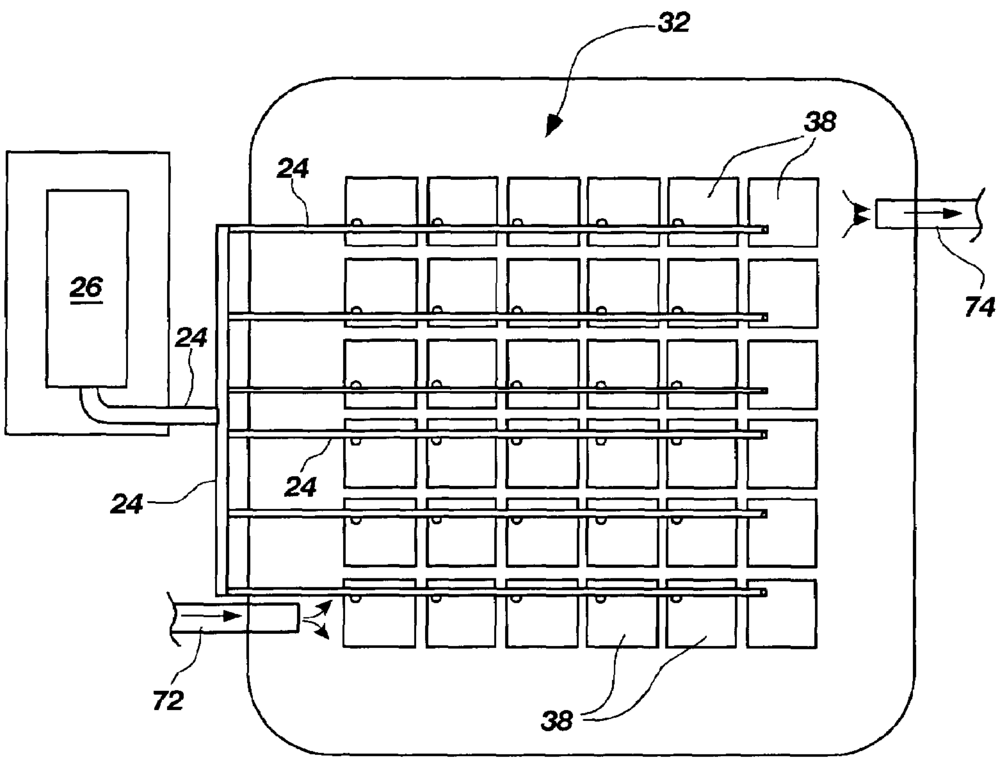
FIG. 4 is a plan view of the wastewater treatment lagoon of FIG. 3.

As a practical matter, however, most wastewater treatment is carried out in relatively shallow lagoons or reservoirs, such as the lagoon 32 shown in FIGS. 3 and 4. In such lagoons, the bottom surface 34 is generally covered by a layer 36 of sediments and solids that have settled out of the wastewater. It is generally desirable to dispose the bio-film panels above this sediment layer. The panels can extend above the top surface of the water, but do not need to do so. Indeed, in areas where ice covers lagoon systems in the winter, the structures must either be submerged below a level where the ice layer forms (which is preferable), or be heavy enough to remain in place when pushed by wind-driven ice. Also, a system must be provided to deliver oxygen to the submerged surface. Naturally, nitrifying bacteria that are suspended out of the water will be limited or stopped in their growth, and will have little or no effect in removing ammonia from the water. However, where the water level in the lagoon can fluctuate, the panels can be configured with a height corresponding at least to the maximum water level.

In the lagoon system shown in FIGS. 3 and 4, a plurality of groups or modules 38 of submerged bio-film panels 10 are supported on individual frames or racks 40 which rest upon the bottom 34 of the lagoon 32. These groups of panels are all interconnected by compressed air conduits 24 that lead to the compressed air source 26. A power source, control devices, pressure regulators, and other components needed for operation of the aeration system are not shown, but their provision and specification would be a routine matter within the knowledge of one skilled in the art. It will also be apparent that the compressor or other compressed air source must be capable of providing air at a suitable pressure, depending on the depth of submersion of the compressed air conduit 18 at the lower end of each panel.

Advantageously, an existing wastewater treatment lagoon can be easily retrofitted with the system of the present invention. A plurality of modules 38, each comprising one assembled rack 40 of bio-film panels 10, can be placed into an existing lagoon at a desired spacing, then interconnected to the compressed air source 26 to begin operation. If needed, the lagoon can be charged with nitrifying bacteria, and after the bacteria has become established, ammonia in the wastewater flowing though the lagoon will be continuously removed.

While the bio-film panels 10 shown in FIGS. 1–4 have a wedge-shaped configuration with planar sides, other configurations can also be used. The panels may be any suitable geometry, and are not limited to the examples illustrated, and include any geometry with curved or flat surfaces disposed vertically or non-vertically, with bubble systems to provide bubbles traveling along the surface. Preferably, the surface that supports the bio-film is neither horizontal nor vertical, so that rising bubbles travel along the surface. As one example, shown in FIG. 5, substantially planar bio-film panels 42 can be oriented at an angle and nested together in a group. Each panel includes an air conduit 44 at its lower extremity, allowing air bubbles 22 to be released to rise up the surfaces of the panels. These individual panels could be supported by a submersible frame similar to that shown and described with reference to FIG. 3.

Figure 5:
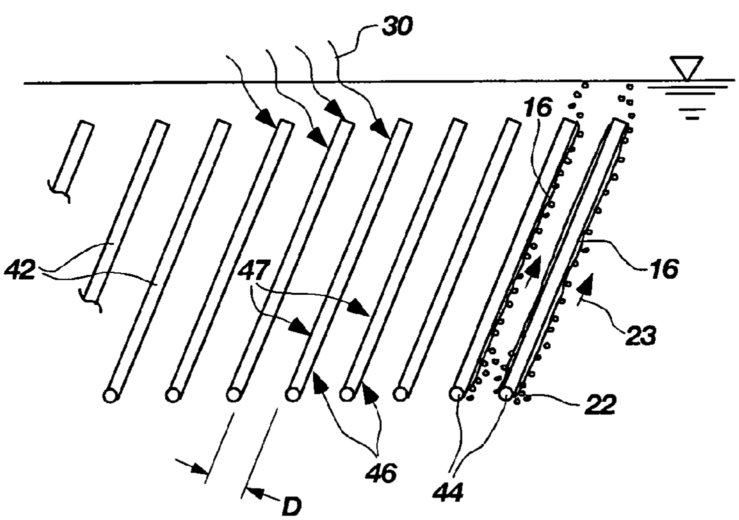
FIG. 5 is a side view of an alternative embodiment of aerated submerged bio-film panels comprising a plurality of planar panels arranged so as to block sunlight from each other.

The configuration shown in FIG. 5 can provide several advantages. First, the submerged panels 42 can be placed at a spacing D that is small enough to allow the upper portion of each panel to help block sunlight 30 from the surfaces of an adjacent panel. Such a configuration can reduce or eliminate the need for additional light shielding. Additionally, it is believed that sufficient reduction of the spacing D can allow the air bubbles 22 to oxygenate both the downward-facing surface 46 of a panel, and at least partially oxygenate the opposing upward-facing surface 47 of the adjacent panel. This can allow both side surfaces of the planar panel to support a bio-film 16 of nitrifying bacteria, thus possibly doubling the effectiveness of each panel.

Alternatively, bio-film panels in accordance with the present invention can comprise other shapes, such as curved surfaces and shells that are configured for submersion in water. For example, in one embodiment shown in FIGS. 6A and 6B, the submerged bio-film shell comprises a hemisphere or dome 48, which has an opening 50 at its top to allow air bubbles 22 to escape. The hemisphere can be configured to rest upon a frame 52 on the bottom 34 of the wastewater lagoon, with a compressed air conduit 54 disposed around the bottom of the shell to provide the air bubbles. Placing the bottom of the hemisphere above the bottom of the lagoon is desirable to allow water to circulate, as shown by arrows 23, and enter the lower end of the hemisphere.

Advantageously, the hemisphere 48 naturally shields its inner surface 56 from sunlight 30, so that a bio-film 16 of nitrifying bacteria can grow thereon. The bubbles 22 released from the air conduit 54 travel up the inner surface, providing oxygen to the bacteria and helping to circulate the water, until reaching the top opening 50, where the bubbles naturally rise to the surface 58 of the water. The use of a shell can be desirable for situations where it is impractical or undesirable to cover an entire lagoon to block sunlight. A plurality of shells can be placed into a lagoon, and by their own geometry provide the appropriate conditions for growth of the nitrifying bacteria.

Figure 6A:
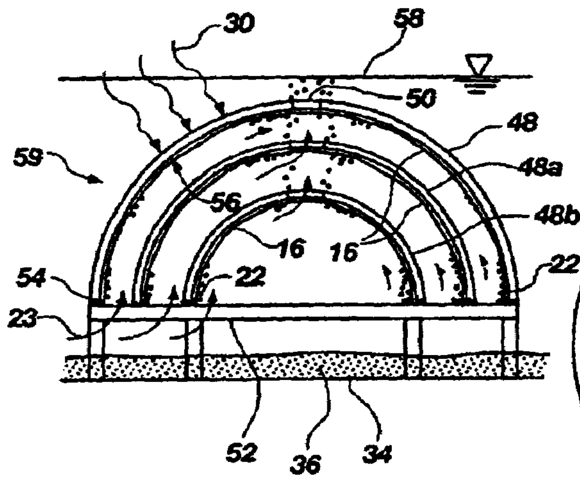
FIGS. 6A and 6B are cross-sectional and plan views, respectively, of an embodiment of aerated submerged bio-film panels wherein the panels comprise nesting hemispheres.
Figure 6B:
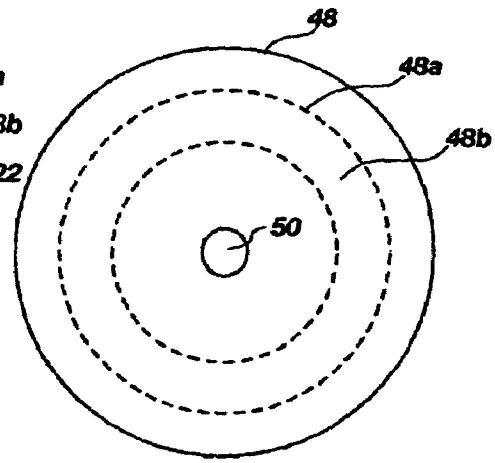

Advantageously, the hemispherical shell configuration can comprise multiple nested hemispherical shells in a module 59, as shown in FIGS. 6A and 6B. Like the outer shell 48, the inner shells 48*a* and 48*b* are each shielded from sunlight 30 by their own structure, and by the next outer shell. While only two inner shells are shown, it will be apparent that the number of nested shells is not restricted to this number. These nesting shells can be supported on the same frame 52, and all function in the same way as the outer shell to provide a surface for nitrifying bacteria and to provide oxygen to the bacteria. Additionally, as with the nesting panels 42 of FIG. 5, the nesting shells can be placed close enough together that nitrifying bacteria can flourish on the outer surfaces of the inner nested shells, and increase the performance of the system.

Figure 7A:
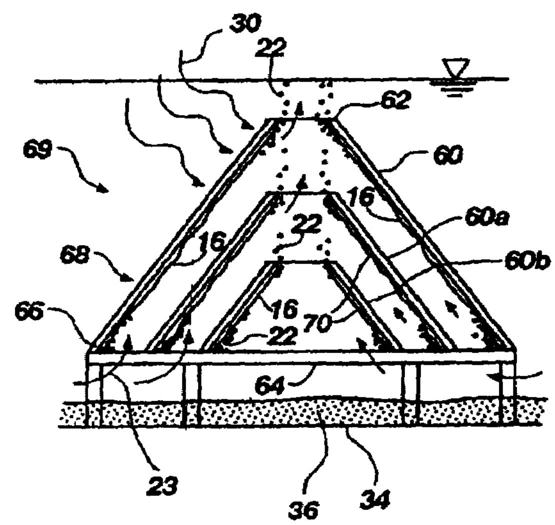
FIGS. 7A and 7B are cross-sectional and plan views, respectively, of an embodiment of aerated submerged bio-film panels wherein the panels comprise nesting pyramids.
Figure 7B:
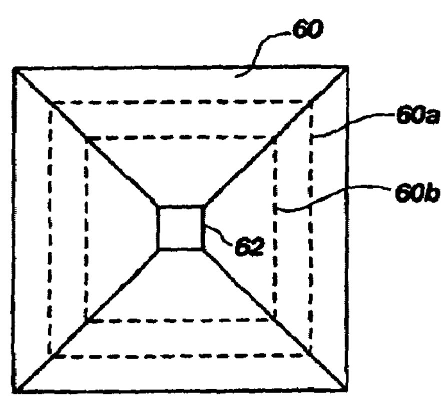

In addition to curved shells, non-curved shells can also be used. Shown in FIGS. 7A and 7B is a pyramidal shell 60. Like the hemispherical shell 48, the pyramidal shell includes an opening 62 at its top to allow bubbles to escape, and is supported on a frame 64 resting on the bottom 34 of the lagoon 32, with air conduits 66 disposed at the bottom of the shell. The outer surface 68 of the shell blocks sunlight 30, allowing a bio-film 16 of nitrifying bacteria to grow on the inner surface 70. Air bubbles 22 released from the air conduit rise up the substantially planar inner surface, as indicated by arrows 23, providing oxygen to the bacteria and circulating the water.

As with the hemispherical shell module 59, a pyramidal shell module 69 can comprise nesting shells, as shown in FIGS. 7A and 7B. The inner pyramidal shells 60*a* and 60*b* are each shielded from sunlight 30 by their own structure, and by the next outer shell. While only two inner shells are shown, the number of nested shells is not restricted to this number. These nesting shells are supported on the frame 64, and function in the same way as the outer shell. As shown in FIG. 7B, the pyramidal shells that are illustrated have a substantially square plan shape, which can make them more space efficient than the hemispherical shells. This shape, comprising substantially flat panel components, may also be easier to fabricate and less expensive.

While two shapes of shells and nesting shells are shown, it will be apparent that other shapes can also be used. For example, a conical shell or series of nesting conical shells can be used. It will also be apparent that non-hemispherical curved shells can be used, and these can be selected for their effect on the rate at which the bubbles 22 rise. Because the hemispherical shell 48 provides a curved inner surface 56, the rate of rising of the bubbles 22 will vary with height. This can provide different contact time of the bubbles with different regions of the bio-film. The inventors are investigating the effects of this phenomenon. Nevertheless, the shape of the shell can be selected to provide different effects on the rate of rising of the bubbles. For example, rather than a hemispherical shell, an elliptical, parabolic, or hyperbolically curved shell could be used. Other curved and non-curved shapes can also be used.

A system incorporating submerged aerated bio-film modules according to this invention can be used in a variety of situations to remove ammonia from water. As described in more detail below, the present invention can be adapted to batch treatment applications, wherein a fixed volume of water is contained and treated for a period of time sufficient to remove ammonia. However, it is believed that perhaps the most common application will be in continuous-flow wastewater treatment lagoons, particularly lagoons originally designed as non-aerated lagoons. Such lagoons can be configured like the earthen lagoon 32 shown in FIGS. 3 and 4. Alternatively, concrete-lined lagoons with vertical side walls, and even above-ground reservoirs, tanks, or basins can be adapted for treatment of water according to the present invention. Indeed, the present invention merely requires a body of water, which can be a static body (e.g. a batch) or a flowing body (e.g. a continuous flow lagoon or the like).

The lagoon of FIGS. 3 and 4 is part of a flow-through or constant flow system, wherein influent enters the lagoon through an inlet 72, and effluent continuously flows out through an outlet 74. Such lagoons are generally sized to allow sufficient residence time of the water in the lagoon for the desired treatment. Those of skill in the art will be able to calculate the quantity of submerged aerated bio-film modules required for a lagoon having a given flow rate.

Figure 8:
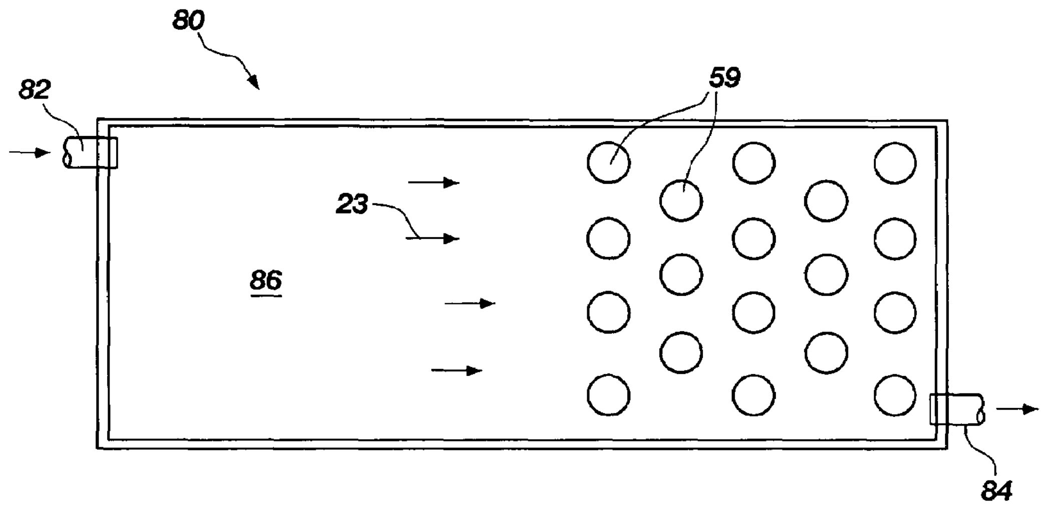
FIG. 8 is a plan view of an open flow treatment reservoir having a plurality of hemispherical ammonia removal modules disposed in a group therein.
Figure 9:
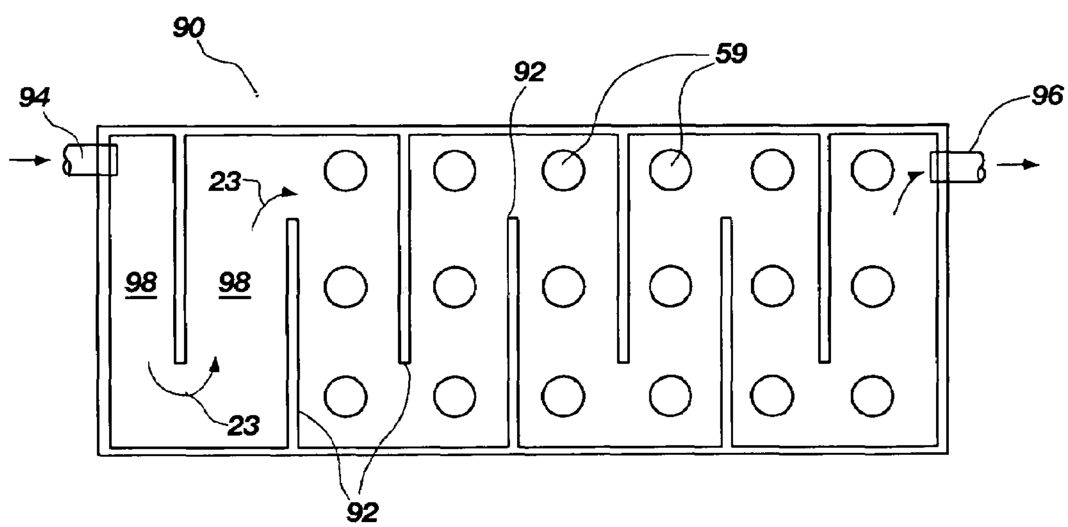
FIG. 9 is a plan view of a channeled flow treatment reservoir having a plurality of hemispherical ammonia removal modules disposed in series therein.

Alternative continuous-flow treatment configurations are shown in FIGS. 8 and 9. Shown in FIG. 8 is a submerged aerated bio-film treatment system comprising a plurality of submerged hemispherical modules 59 disposed in an open-flow lagoon or reservoir 80. Water enters the lagoon through the inlet 82, and gradually flows toward and past the submerged biofilm modules as it works its way toward the outlet 84. The submerged modules are grouped toward the outlet in order to provide a settling area 86 toward the inlet. This settling area provides a region in which suspended solids and organic material can settle out of the water before encountering the submerged bio-film modules. This helps to reduce the level of organic material in the water by the time the water reaches the submerged modules, and thus helps reduce the level of heterotrophic bacteria that may grow on the submerged panels. Nitrifying bacteria are autotrophs. These naturally compete with heterotrophic bacteria, which consume organic material. The inventors have found that in a continuous-flow ammonia treatment system, the heterotrophic bacteria tend to dominate until the COD level (caused by the presence of organic material) drops below a certain level, after which the autotrophs begin to dominate. Consequently, submerged aerated bio-film modules located closest to the inlet in a continuous flow system appear to support a higher proportion of non-nitrifying (heterotrophic) bacteria, and thus provide lower levels of ammonia removal, while those nearer the outlet tend to include solely nitrifying bacteria. Thus, allowing a substantial quantity of organic material to settle out of the water will contribute to the desired operation of the submerged modules.

Shown in FIG. 9 is an alternative continuous-flow treatment system comprising a channeled lagoon 90 having a series of baffles 92 that force the water to flow along a serpentine path from the inlet 94 to the outlet 96. The submerged hemispherical modules 59 are arranged in series through the channeled lagoon, thus causing the water to traverse each module as it passes through the lagoon. Like the open-flow lagoon 80 of FIG. 8, the channeled lagoon 90 includes a settling area 98 near its inlet to provide a region in which suspended solids and organic material can settle out of the water before encountering the first submerged bio-film modules.

As noted above, the aeration system of the submerged modules causes water surrounding the modules to circulate gently. This feature advantageously helps to promote complete treatment of the water, rather than allowing some portions of water to short-circuit to the outlet without complete treatment. That is, as a given volume of water passes a submerged module, the currents created by the motion of air bubbles associated with that module will tend to mix and circulate the volume of water so that a substantial portion of that water is drawn into the module and brought into contact with the nitrifying bacteria. Those portions of the volume that are not actually treated by a given module will be mixed and dispersed so that treatment by a subsequent module is likely. Thus, as the water works its way toward the outlet, the chances are very high that the entire volume will be treated along the way. The channeled lagoon configuration in particular is designed to increase the likelihood that the water will be fully treated.

Batch Operation

The inventors first tested the system of the present invention in a batch treatment configuration, wherein a given volume of ammonia-containing wastewater was contained, treated, and then released. A pilot scale system was built using an 8'×24' commercial dumpster 3' deep with 24 submerged bio-film panel modules installed. Each module consisted of 12 individual panels, configured as shown in FIGS. 1 and 2. The panels were 28 inches wide by 24 inches tall, with a fine bubble distribution tube along the bottom. Total surface area for bio-film colonization was 2794 square feet. The wastewater volume was 1600 gallons when the dumpster was filled to a depth of 2 feet. Total air supply to the modules was 7.5 to 8 cubic feet per minute at a pressure of about 3 psi. The top of the pilot plant was covered with wooden panels to block sunlight. The dumpster was set up beside an effluent ditch leading from primary clarifiers to trickling filters at a major municipal wastewater treatment facility. Wastewater in the effluent ditch had a typical ammonia concentration of between 25 and 30 mg/L at the start of each week.

Figure 10:
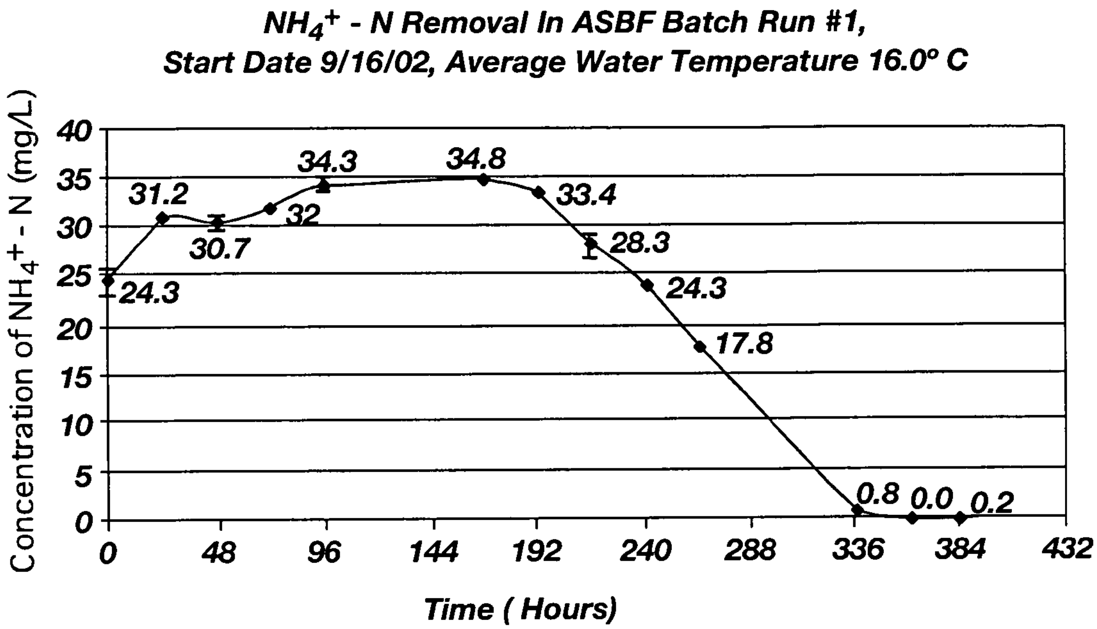
FIG. 10 is a graph showing ammonia removal over time in a first run using one embodiment of the invention in a batch process test.
Figure 11:
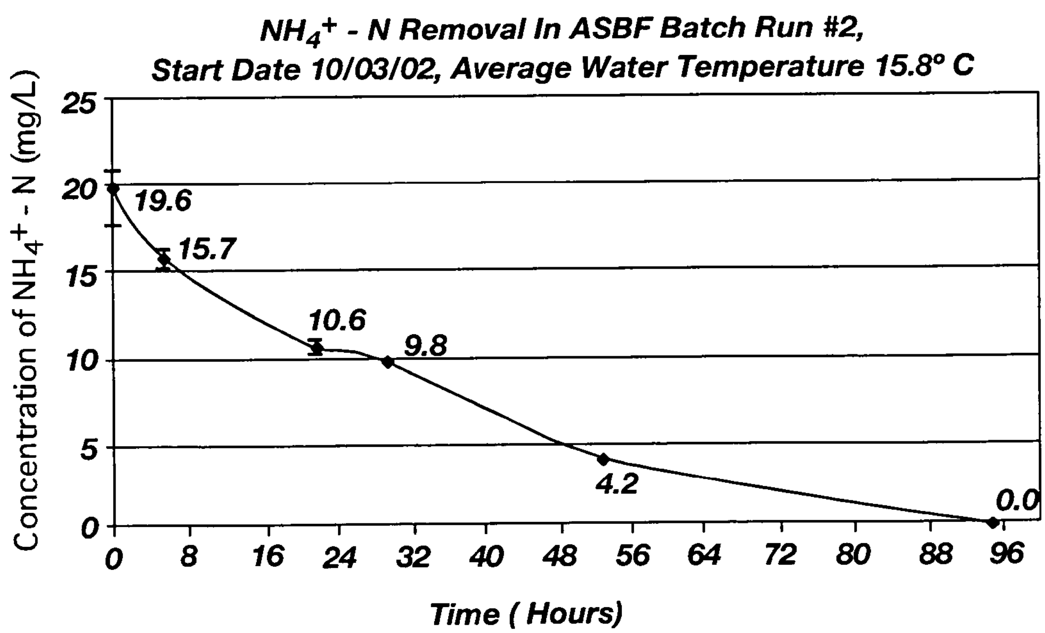
FIG. 11 is a graph showing ammonia removal over time in run #2 of the batch process test.

In a batch mode, the submerged panels were first inoculated with buckets of trickling filter effluent water. Several times during the first week, buckets of water from the treatment plant trickling filter effluent were poured over the modules in an effort to seed the bio-film panels with nitrifying bacteria. Ammonia removal during this initial phase (Run #1) is shown in graphical form in FIG. 10. At first, ammonia concentrations increased slightly, apparently due to the absence of nitrifying bacteria. After this initial lag phase of about eight days, however, the effects of a healthy nitrifying bio-film began to be manifest. The bio-film began to remove the ammonia from the wastewater, and during the following 6 days, essentially all of the ammonia was consumed. The treated water from the dumpster was released, and the dumpster was then refilled with a fresh batch of wastewater for Run #2. Ammonia removal over time for Run #2 is shown in graphical form in FIG. 11. In this run the bio-film immediately began consuming the ammonia, and after 4 days the ammonia was gone.

Over a period of three and one half months, this process was repeated for a total of 11 batch runs using wastewater with slightly varying characteristics, and in varying weather and temperature conditions. The time required to consume the ammonia decreased with each of the first few runs until it appeared to settle in at around 40 hours. This shortening of reaction time is thought to be a result of the maturing of the nitrifying bio-film. It was also observed after about the third run that the bio-film on the surfaces of the panels was thinner, and had taken on a reddish hue. This color is consistent with the literature on nitrifying bacteria.

Figure 12:
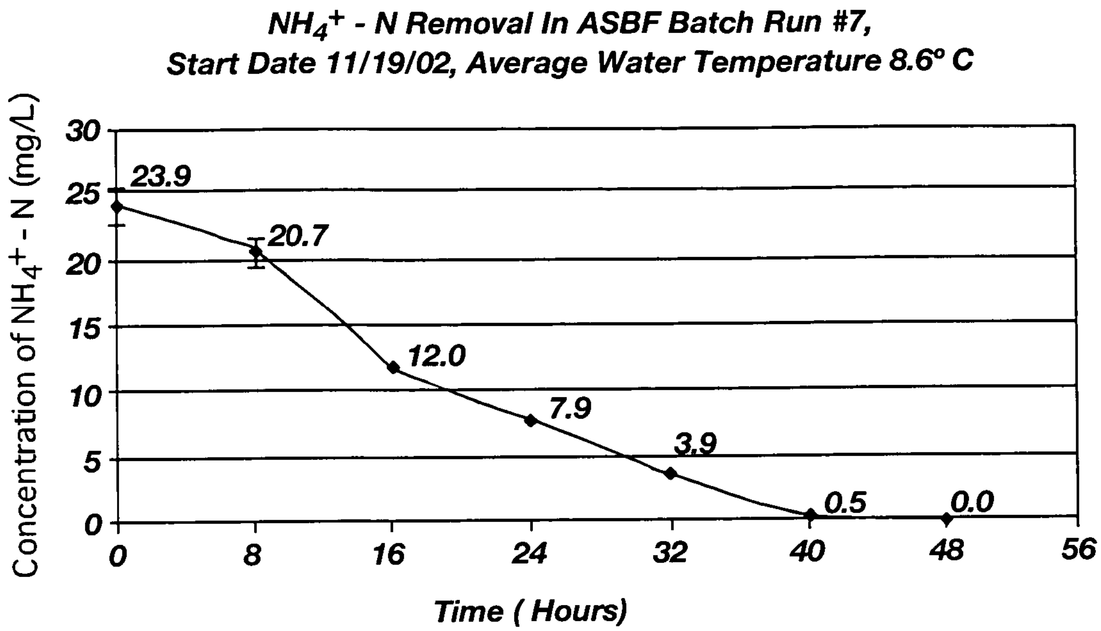
FIG. 12 is a graph showing ammonia removal over time in run #7 of the batch process test.

Ammonia concentration over time for Run #7 is shown in FIG. 12. This run is fairly typical of the results of the runs after the nitrifying bio-film became established. In addition to ammonia concentration over time, a variety of other parameters were also measured during each run to provide a clear indication of what was taking place. Graphs of these measurements for Run #7 are shown in FIGS. 12–15. Proof of biological nitrification was established by measuring nitrite and nitrate levels along with ammonia levels. A simplified model of the nitrogen pathway for biological nitrification is as follows:

$$NH_4^+ \rightarrow NO_2^- \rightarrow NO_3^-$$

Accordingly, the removal of ammonia should result in a measurable increase in the intermediate compound nitrite and a significant increase in the end product of nitrate.

Figure 13:
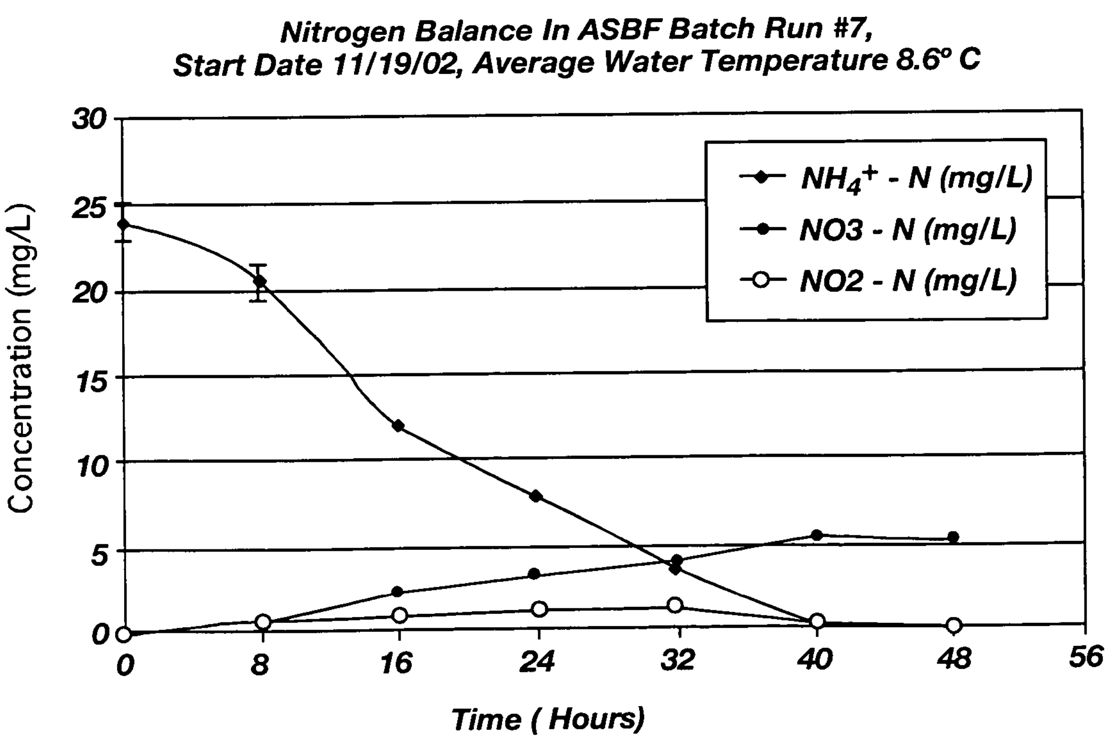
FIG. 13 is a graph showing ammonia, nitrate and nitrate levels during run #7 of the batch process test.

The results of these measurements for Run #7 are shown in FIG. 13, and are consistent with these expectations, showing a very clear picture of biological nitrification. As can be seen from this graph, as the ammonia level dropped, nitrite levels rose moderately (an intermediate), and nitrate levels rose significantly to around 6 mg/L. In some earlier runs, possibly because the water temperature was warmer, the nitrate levels dropped off after the ammonia was expended, indicating possibly the presence of denitrifying anaerobic bacteria, which consume nitrate and convert it into nitrogen gas.

Figure 14:
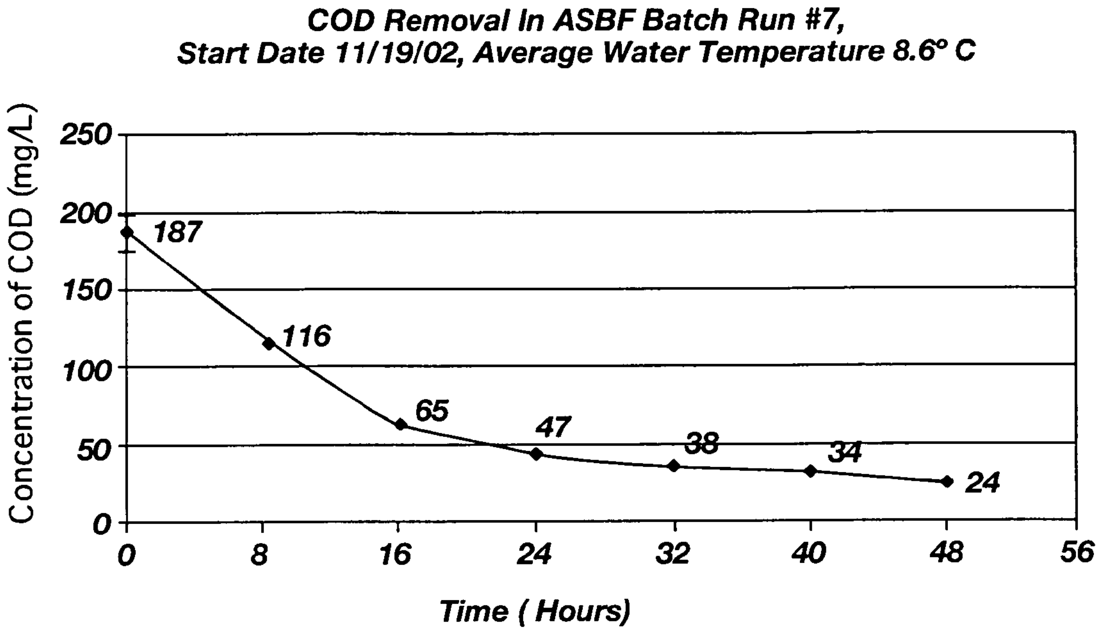
FIG. 14 is a graph showing chemical oxidation demand (COD) removal during run #7 of the batch process test.

Oxygen demand of the wastewater was also monitored for each test run, and dropped significantly during each of the batch runs, as expected. The wastewater treatment plant at which this pilot plant was run monitors both chemical oxidation demand (COD) and biological oxidation demand (BOD). The COD/BOD ratio for the source water at this plant is typically 0.48. Measurement of the COD level in Run #7 is shown in FIG. 14. In this run, the COD levels dropped from 187 mg/L to around 24 mg/L. These results are fairly typical of all of the batch runs, except Run #9, as will be discussed below.

Alkalinity levels were also monitored. Nitrifying bacteria utilize the energy stored in ammonia for their own metabolism, as well as utilizing some of the nitrogen atoms to build cell material. An example is typified in this reaction:

$$NH_4^+ + 1.83O_2 + 1.98HCO_3^- \rightarrow 0.021C_5H_7NO_2 + 1.041H_2O + 0.98NO_3^- + 1.88H_2CO_3$$

Biological nitrification consumes $NH_4^+$, $O_2$, and $HCO_3^-$. At the pH of this system (around 8), $HCO_3^-$ is one of the major components of alkalinity. Therefore, biological nitrification should result in a decrease in alkalinity.

Figure 15:
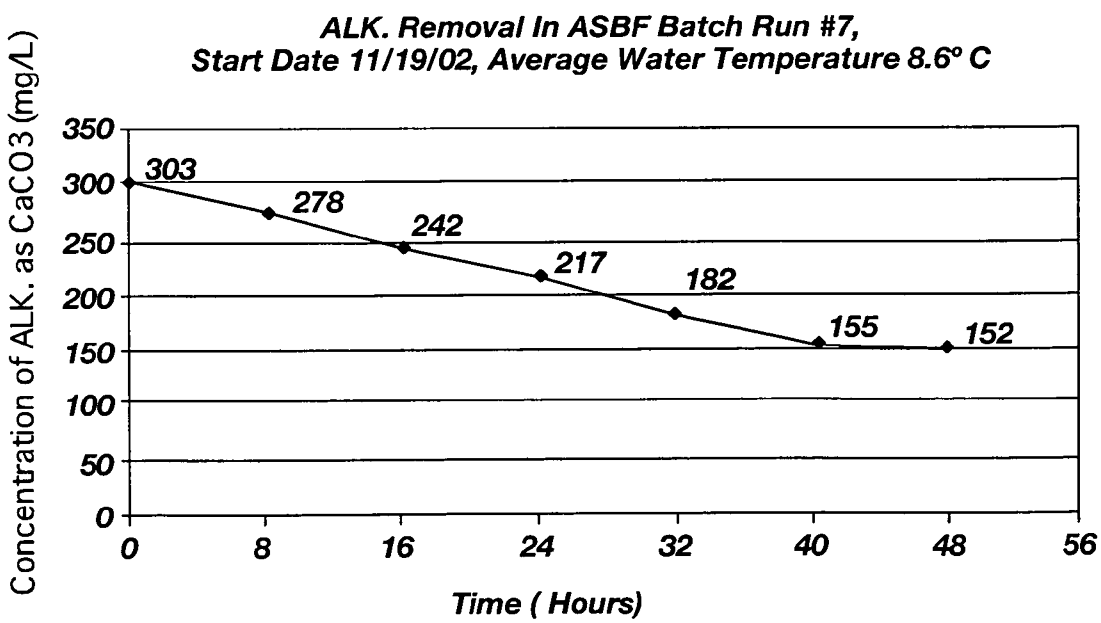
FIG. 15 is a graph showing alkalinity removal during run #7 of the batch process test.

For batch Run #7, alkalinity was monitored and the results are shown in FIG. 15. As the graph shows, the alkalinity level dropped from around 300 mg/L to around 150 mg/L, providing additional evidence of the mechanism of biological nitrification. The reduction in alkalinity shown by these measurements is consistent with nitrification, and provides additional evidence that the intended processes were taking place.

Figure 16:
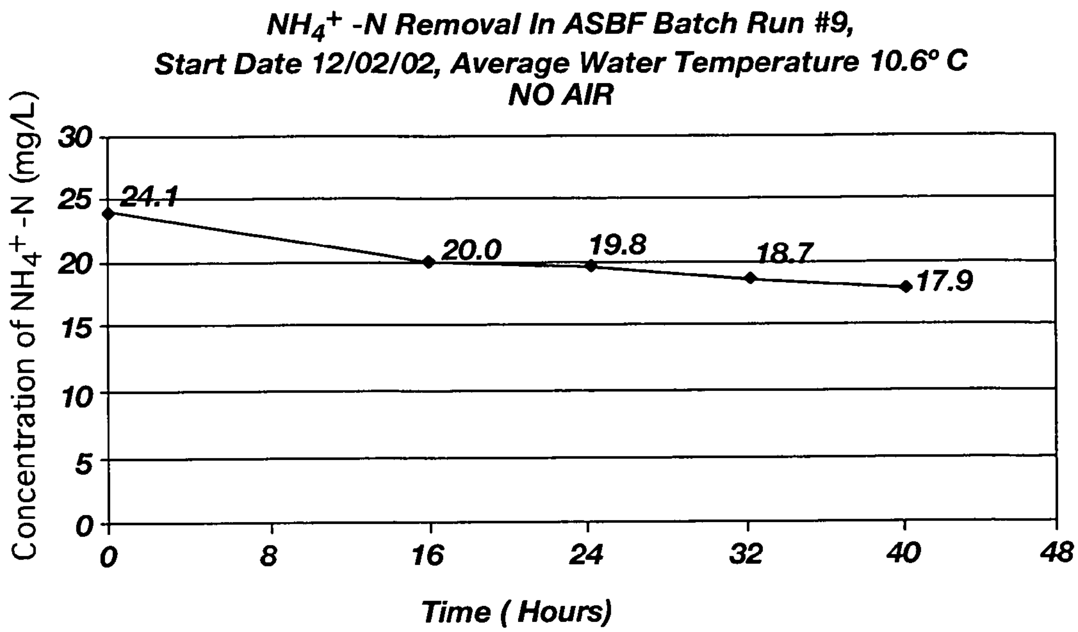
FIGS. 16 and 17 are graphs showing ammonia removal over time and chemical oxidation demand (COD) removal during run #9 of the batch process test, a control run without aeration.
Figure 17:
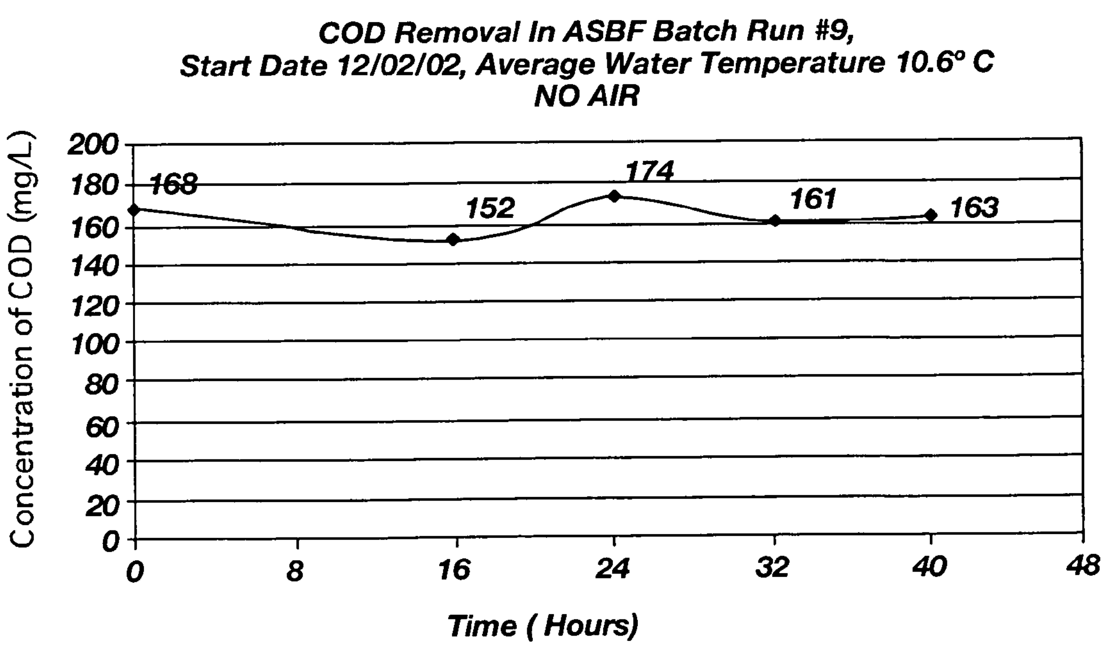

On Run #9, the aeration system was left off as a control run, and the results of some measurements from this run are shown in FIGS. 16–17. As shown in FIG. 16, ammonia was barely consumed during Run #9, with the level dropping from 24 mg/L to about 18 mg/L in 40 hours. In Batch Run #9, there was also virtually no reduction in oxygen demand, as shown in FIG. 17. The next week, however, run #10 was started with aeration, and the results substantially returned to previous levels. Within 40 hours, essentially all the ammonia was gone from the water, and other parameters were consistent with previous results.

By the end of the batch run operation test, the average water temperature during the runs had dropped to around 6° C. and at one point was as low as 3.3° C. Advantageously, the bio-film continued to perform even at these low temperatures, reducing ammonia levels from around 25 mg/L to basically zero within 40 to 48 hours. This is significant. The inventor's results confirm that, unlike suspended growth nitrifying bacteria, which are inhibited at temperatures below 10° C., the fixed-film nitrifying bacteria remain active and effective at temperatures approaching 0° C.

Plug-Flow Operation

Figure 18:
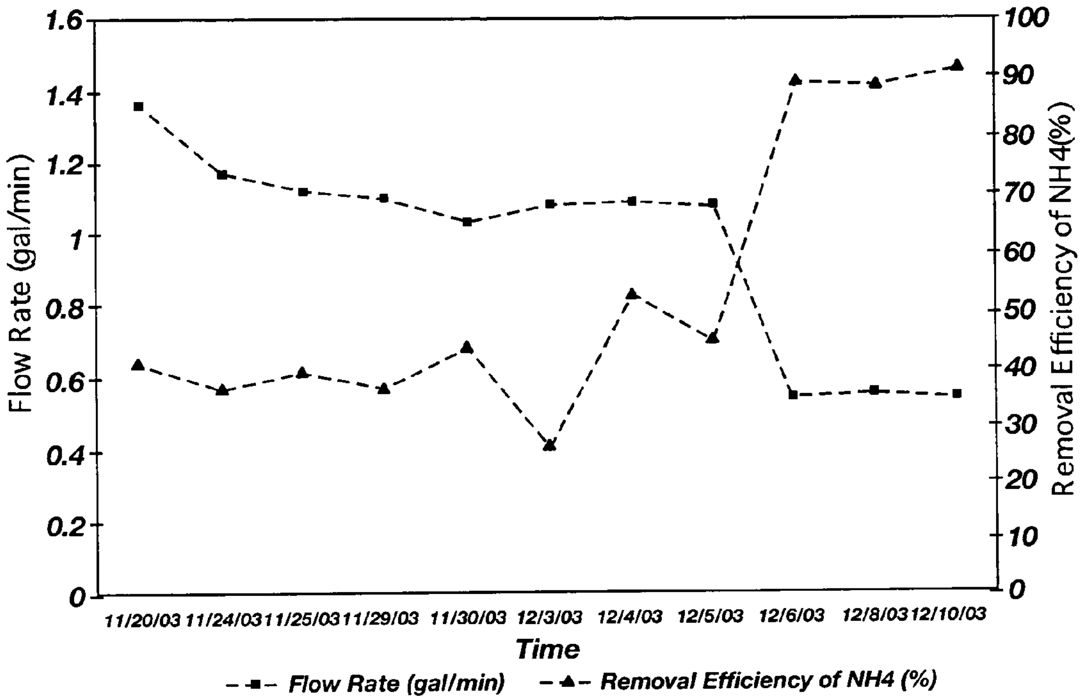
FIG. 18 is a graph showing Flow Rate vs. Ammonium Removal Efficiency in PFR Phase III.
Figure 19:
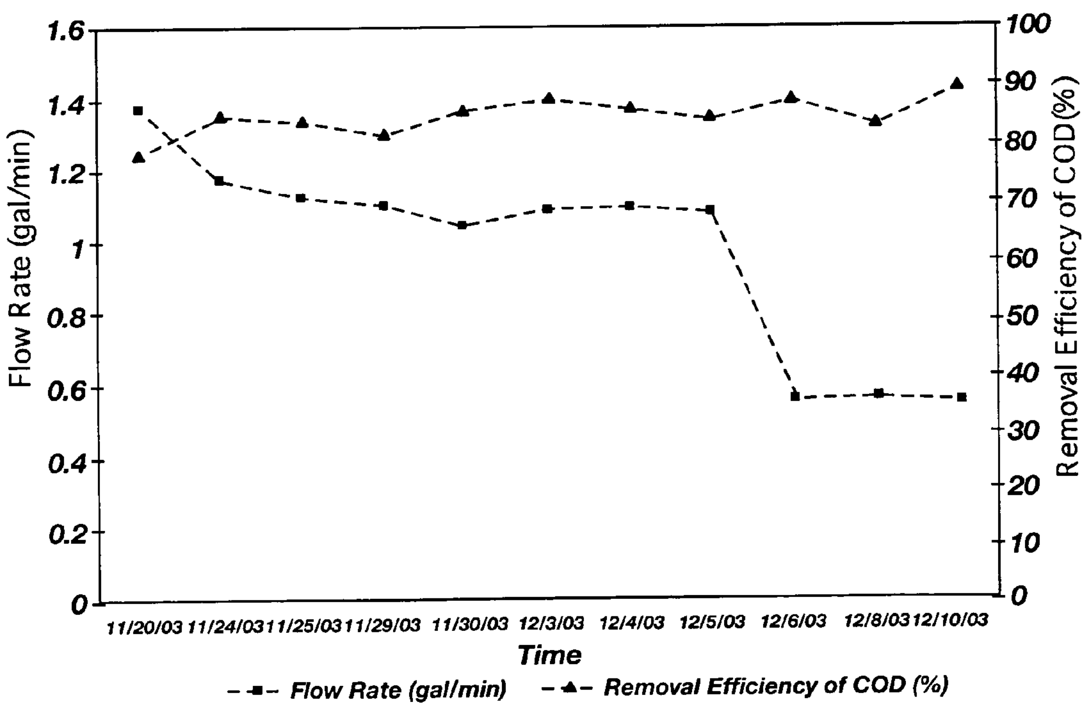
FIG. 19 is a graph showing Flow Rate vs. COD Removal Efficiency in PFR Phase III.

The inventors also tested the present invention in a continuous plug-flow system to demonstrate the applicability of the invention to continuous-flow lagoon treatment systems. Some results of this test are shown in FIGS. 18–19. The plug-flow test used the same apparatus as the batch treatment test described above, except that a submersible pump was installed to pump water from the aeration ditch at the wastewater treatment plant at a controlled rate, and water was allowed to flow out of the test apparatus at the same rate. Flow rate was measured in an influent tank with a 500 ml glass beaker and a timer. Performance of the system was tested in three phases, referred to as Phase I, Phase II, and Phase III.

A series of batch runs were performed prior to starting the continuous plug flow reactor (PFR) configuration to facilitate seeding the panels with nitrifying bacteria, and allowing the bacteria to mature. This was done to allow easier handling to measure and monitor initial and final concentrations of interesting substances than the PFR system. The results of the initial batch runs were consistent with those reported above, including some start-up lag time when the nitrifying bacteria was not mature.

There were 22 measurements taken over 18 days for Phase I. In Phase I, initial flow rates were set at 0.61 gal/min. In these runs, pH increased during nitrification, conductivity dropped slightly, turbidity dropped dramatically, and dissolved oxygen levels increased moderately. Most importantly, concentrations of ammonia nitrogen and COD dropped significantly through the pilot plant during the first series of measurements.

Flow rate was then increased to above 1.0 gal/min, and the removal rates of ammonia nitrogen and COD were still substantial. Because of some pump problems, flow rate was decreased back to various levels between 0.61 and 1.0 gal/min for the remainder of Phase I. With these flow rates, the plug flow pilot plant was able to remove ammonia nitrogen and COD very well.

Following this success in removal of ammonia nitrogen and COD with flow rates below 1 gal/min., a higher capacity submersible pump was installed at the pilot plant for Phase II, and five runs were undertaken. Flow rate was initially set at 2.1 gal/min. Among other things, the rate of removal of ammonia nitrogen was worse than in Phase I, but the rate of removal of COD was similar to Phase I. Flow rate was then adjusted to 1.31 gal/min for the remainder of Phase II because excessive flow rates around 2.0 gal/min for several days had caused the nitrifying bacteria to become lethargic. This was believed to be due to excessive nutrients and a lack of dissolved oxygen. Even when the flow rate was thus decreased, the rate of removal of ammonia nitrogen was not as good as in Phase I.

In Phase III, the flow rate was initially set at 1.36 gal/min, and adjusted as shown in FIGS. 18 and 19. Throughout Phase III influent grab samples were paired with effluent grab samples taken at a point at the end of the calculated retention time in order to obtain the removal efficiency values shown in the figures. The initial flow rate of 1.36 gal/min gave a calculated retention time of 1,179 minutes or 19.7 hours. As shown in FIGS. 18 and 19, the removal percentages of ammonia nitrogen and COD through the system at this flow rate were 41% and 77% respectively. At the next flow rate, 1.17 gal/min, the calculated retention time was 22.8 hours. The removal percents of ammonia nitrogen and COD were 36% and 85% respectively. The removal percent of ammonia nitrogen was lower whereas the removal percent of COD was higher compared to measurement A.

Similarly, for subsequent measurements in Phase III, the flow rate was varied from a maximum of 1.27 gal/min to a minimum of 0.56 gal/min. As is apparent from FIG. 18, and as would be expected, the nitrification activity was highest with lower flow rates, and declined at the higher flow rates. Specifically, ammonia removal efficiency was around 90% when flow rates were around 0.5 gal/min. This result makes sense because lower flow rates correspond to longer residence time or retention time of the wastewater in the treatment reactor, allowing the nitrifying bacteria to remove greater amounts of ammonia. As shown in FIG. 19, COD efficiency was around 90% at the lower flow rates, but was generally above 80% for all flow rates. The performance of the plug flow system fluctuated at times during Phase III because of the introduction of some shock loads, temporary power failures, etc. during the PFR test. Measurements following these irregular conditions were removed from the graphs shown in FIGS. 18 and 19 because those results are considered unreliable and not representative of the actual operation of the system.

The main results of the plug flow system test for treatment of the aeration ditch water by the submerged bio-film system can be summarized as follows. Throughout operation, pH increased during nitrification in the reactor. The higher the water temperature, the better nitrification occurred. Conductivity, turbidity, and salinity dropped. Dissolved oxygen levels dropped very rapidly in the region of the reactor just following the inlet, but then began to increase from the region of the #8 module toward the outlet of the reactor. Ammonia nitrogen removal rates were more sensitive than COD removal rates when flow rates were over 1 gal/min. Maximum flow rate for effective operation of this reactor appeared to be about 1 gal/min.

CONCLUSION

From the results of the pilot tests, it is apparent that this invention provides a robust solution to the problem of ammonia removal. The aerated submerged surfaces will grow nitrifying bio-film that consume ammonia compounds from wastewater. It is believed that those skilled in the art will be able to determine appropriate ways to provide this aerated bio-film in a full-scale lagoon system.

The primary advantage of a lagoon system is low maintenance and operational costs. The submerged bio-film modules fit well into this operational scenario. They are essentially passive devices that, once in place, will require little ongoing maintenance. Because they are modular, the devices could be added to a lagoon a few at a time until the desired level of treatment is attained. The aerated submerged bio-film modules tested in this pilot plant are a good start to meeting these requirements.

This submerged bio-film process could be beneficial to animal operations with wastewater lagoon systems. As an example, the inventors have considered the needs for an open flow lagoon system (similar to that shown in FIG. 8) at a dairy farm supporting a herd of 500 dairy cows. At such an installation, approximately 55 nested hemispherical modules (configured as shown in FIGS. 6A and 6B) with an outside diameter of 6 ft. would be needed to adequately remove ammonia from the wastewater. Such a dairy farm could be expected to have a wastewater lagoon occupying about 1 acre (or more), and the submerged hemispherical modules would take up about 2000 square feet of the lagoon space, or about 4.5% of a 1 acre lagoon.

This sort of system is beneficial in several ways. First, odorous ammonia concentrations are reduced and replaced with the more benign nitrate. Oxygen demand of the wastewater is greatly reduced. Mixing would occur in the lagoon, which would reduce stratification and allow for more consistent pollutant removal. Short-circuiting of wastewater from the inlet to the outlet could also be reduced simply by the presence of physical barriers (the submerged modules) that naturally create water circulation by virtue of their aeration system. For animal operations, where the treated lagoon water is returned for barn flushing, the cleaner lagoon effluent would improve the air quality and reduce the demand for fresh makeup water.

If lagoon effluent is used for irrigation, the nitrate concentrations could be beneficial to crops. In applications where the lagoon effluent is to be discharged to surface waters, longer detention times with the aerated submerged bio-film modules would most likely lead to the removal of the nitrate through the biological process of denitrification. In summary, the aerated submerged bio-film modules offer the potential for a low-cost upgrade to lagoon systems, leading to better odor and pollution control.

It is to be understood that the above-referenced arrangements are illustrative of the application for the principles of the present invention. It will be apparent to those of ordinary skill in the art that numerous modifications can be made without departing from the principles and concepts of the invention as set forth in the claims.

What is claimed is:

1. A system for reducing the content of ammonia in a body of water, comprising:

a continuously inclined surface configured to provide a continuous interaction of air bubbles against substantially an entire length of the inclined surface while traveling toward a top of the body of water, the continuously inclined surface being substantially submerged in the body of water, wherein substantially the entire surface is at an incline;

a bio-film of nitrifying bacteria disposed on the surface; and an aeration system, couplable to an air supply system, configured to release air bubbles toward a bottom of the inclined surface, such that the air bubbles travel along the surface as they rise so as to (i) create aerobic conditions at the bio-film and (ii) engage the air bubbles in a continuous mixing action in a micro climate of the bio-film in response to an orientation of the continuously inclined surface.

2. A system in accordance with claim 1, wherein the inclined surface comprises a planar surface aligned at a non-vertical angle, so as to retain the bubbles along the surface.

3. A system in accordance with claim 1, wherein the inclined surface comprises a nesting shape configured to nest with other inclined surfaces.

4. A system in accordance with claim 3, wherein the nesting shape comprises a shell with an open bottom and an opening at an apex thereof.

5. A system in accordance with claim 4, wherein the shell has a shape selected from the group consisting of a hemisphere, a truncated pyramid, and a truncated cone.

6. A system in accordance with claim 4, wherein the shell comprises a plurality of shells, configured to be disposed one within another, each of the plurality of shells having a clearance therebetween for allowing water to pass through.

7. A system in accordance with claim 1, further comprising a frame, configured for supporting a plurality of inclined surfaces in the body of water.

8. A system in accordance with claim 1, wherein the water is wastewater.

9. A system in accordance with claim 1, further comprising means for shielding the inclined surface from sunlight.

10. A system in accordance with claim 9, wherein the means for shielding is selected from the group consisting of a cover, and inclined surfaces having nesting shapes that shield each other from sunlight.

11. A system in accordance with claim 1, wherein the aeration system further comprises:

an air conduit, disposed toward the bottom of the inclined surface, having openings for allowing air bubbles to escape therefrom; and an air supply system comprising an air pump, configured to pump air into the air conduit.

12. A system for reducing the content of ammonia in wastewater, comprising:

a continuously inclined surface, substantially submerged in the wastewater, wherein substantially the entire surface is is at an inclined orientation to provide a continuous interaction of air bubbles against substantially an entire length of the inclined surface, substantially shielded from sunlight, and having a bio-film of nitrifying bacteria thereon; and an aeration system, configured to release air bubbles at a lower extremity of the inclined surface, such that the air bubbles travel along the inclined surface as they rise to create aerobic conditions at the bio-film, and the wastewater is circulated along the inclined surface.

13. A system in accordance with claim 12, wherein the inclined surface is disposed in a wastewater lagoon, the wastewater in the lagoon having a sufficient residence time therein to allow the nitrifying bacteria to substantially completely remove ammonia from the wastewater.

14. A method for reducing the content of ammonia in water, comprising the steps of:

providing a submerged surface having a bio-film of nitrifying bacteria growing thereon;

orienting substantially the entire submerged surface at a continuous incline in order to provide a continuous mixing action of air bubbles in a micro climate of the bio-film along substantially an entire length of the submerged surface in response to an orientation of the continuously inclined surface;

creating air bubbles that travel along the surface as they rise to create aerobic conditions on the surface;

contacting the water along the submerged surface to allow the nitrifying bacteria to remove ammonia from the water.

15. A method in accordance with claim 14, further comprising the step of shielding the submerged surface from sunlight.

16. A method in accordance with claim 14, wherein the step of providing the submerged surface comprises providing a substantially non-vertical submerged surface, so as to retain the bubbles along the surface as the bubbles rise.

17. A method in accordance with claim 14, wherein the step of providing the submerged surface comprises providing a curved submerged surface.

18. A method in accordance with claim 14, further comprising the step of retaining the water in proximity to the submerged surface for a sufficient residence time to allow the nitrifying bacteria to substantially completely remove ammonia from the water.

* * * * *